Oct. 2, 1934.  W. HUCKS  1,975,722
METHOD OF AND APPARATUS FOR AERATING LIQUIDS
Filed May 5, 1933
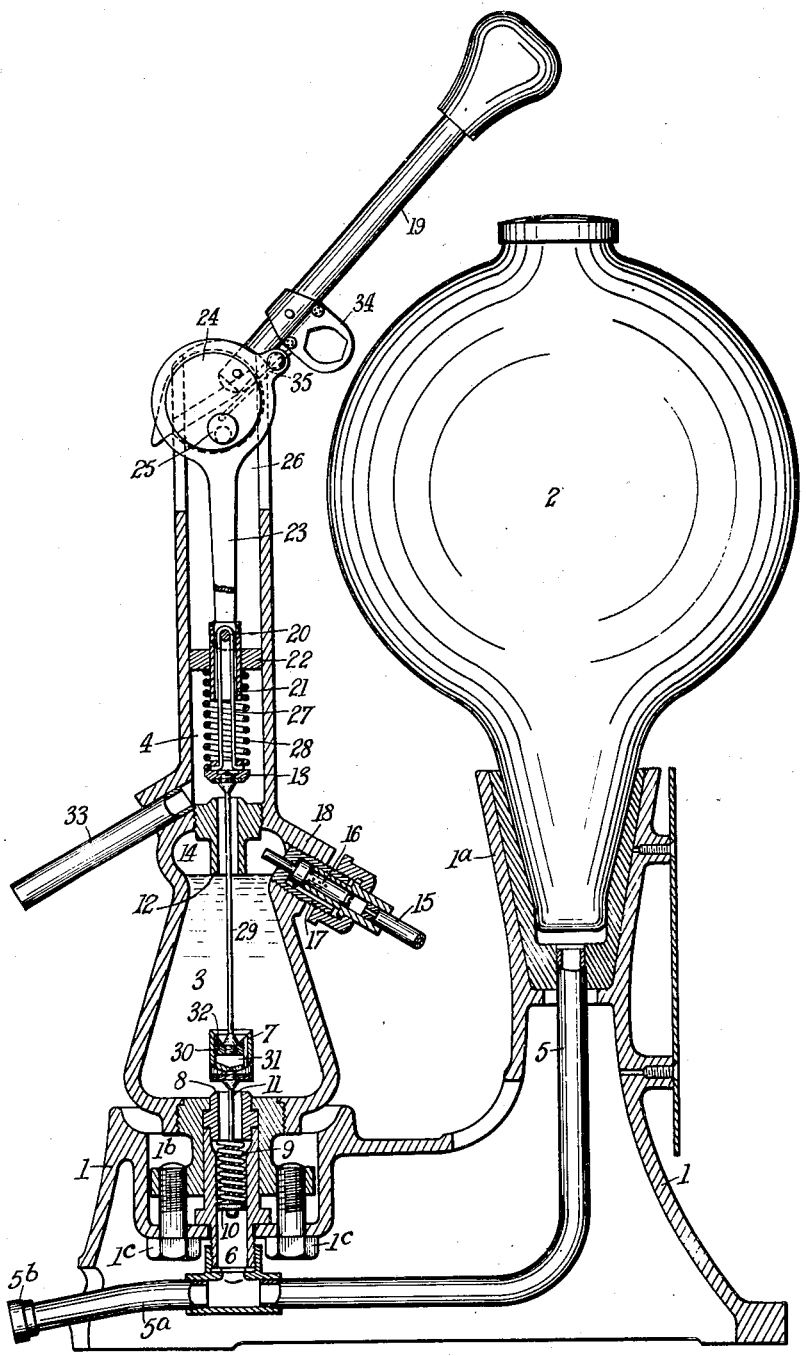
INVENTOR
WILLIAM HUCKS
by his attorneys
Howson and Howson Patented Oct. 2, 1934

1,975,722

UNITED STATES PATENT OFFICE 1,975,722

METHOD OF AND APPARATUS FOR AERATING LIQUIDS

William Hucks, Camden Town, England, assignor of one-half to Sodastream Limited, Camden Town, England, a British company Application May 5, 1933, Serial No. 669,609
In Great Britain June 16, 1932

5 Claims. (Cl. 225—21)

This invention relates to methods and apparatus for aerating water or other liquid, (hereinafter referred to as water) in small quantities at a time, wherein an aerating receptacle has a valve controlled inlet port through which water, from a source of supply, is admitted into the said aerating receptacle, and means are provided for admitting aerating gas, under pressure, into the aerating receptacle to aerate the water therein, and for expelling the aerated water through an outlet port, controlled by a combined discharge and safety valve, into a discharge vessel from which it passes through an outlet spout into a glass or other vessel, placed in position to receive it.

In apparatus for effecting the aeration of water, as aforesaid, the aerated water has hitherto been expelled from the aerating receptacle by a piston-like body reciprocatory therein.

This invention has for its object to provide an improved method and simplified construction of apparatus, whereby the aforesaid reciprocatory piston-like body is dispensed with, and consists in expelling the aerated water from the aerating receptacle by the inflow of a succeeding supply of non-aerated water admitted thereto when the inlet and outlet ports of the receptacle are open.

Apparatus in accordance with this invention comprises an aerating receptacle, preferably of conoidal formation, in communication at its base with a supply of water from any suitable container, for example, by a tube from an inverted bottle, in the known manner, or from a main. Communication between the aerating receptacle and the water container or main is effected through an inlet port in the base of the aerating receptacle, the said port being controlled by a valve normally held on to its seating by a spring.

The discharge vessel is preferably situated above and cast in one with the aerating receptacle and the water passes from the said receptacle into the discharge vessel through a passage the outlet port of which is controlled by the combined discharge and safety valve. The gas under pressure may be conveyed by a pipe from a gas container to the said aerating receptacle, the end of the said pipe being preferably fitted with a needle jet or atomizer housed in the wall of the aerating receptacle above the water level.

The combined discharge and safety valve controlling the aforesaid outlet port is connected to an operating hand-lever by means, hereinafter described, which, irrespective of movement of the said lever, will permit the said valve to open if a predetermined pressure is exceeded in the aerating receptacle.

The general construction of the apparatus comprises a pedestal carrying the aforementioned combination of aerating receptacle, discharge vessel and operating mechanism and also the water bottle or container, the pipe leading from the said container to the valve at the base of the aerating receptacle being suitably arranged to serve as a means for draining the aerating receptacle when it is necessary to empty it.

If desired, a counting device may be provided to indicate the number of operations, or the amount of water aerated and drawn off.

The valve controlling the inlet port of the aerating receptacle is connected to the valve controlling the outlet port thereof by means such that movement of the operating hand-lever operates both valves in their proper sequence.

I will more particularly describe this invention with reference to the accompanying drawing which illustrates, in section, an apparatus constructed in accordance therewith, the valves being shown in their open position.

Referring to the drawing, 1 indicates a pedestal having a socket 1a adapted to receive the neck of an inverted bottle 2 for containing a supply of water to be aerated and a recessed portion, or well, 1b to the base of which is secured, by bolts 1c, the lower portion of a unit comprising an aerating receptacle 3, a discharge vessel 4 formed in one with the said receptacle, and controlling and operating means, hereinafter described, associated with the said vessel and receptacle. The water is conveyed from the inverted bottle 2 to the aerating receptacle 3 by a pipe 5 in communication with a passage 6 opening into the base of the said receptacle and controlled by a valve 7 normally held on its seating 8 by a spring 9 interposed between a shoulder in the said passage and a head 10 on the stem 11 of the said valve.

Communication between the aerating receptacle 3 and the discharge vessel 4 is effected through a tubular piece 12 screwed into the partition between the said receptacle and vessel and having its outlet end controlled by a combined discharge and safety valve 13. The tubular piece 12 projects downwardly into the aerating receptacle 3 and constitutes means for effecting an air-lock space 14 at the top of the said receptacle thus providing a normally water-free space into which the end of a needle jet, or atomizer, 16 projects which admits gas under pressure into the said receptacle, when required, to aerate the water therein. The gas under pressure is conveyed by a pipe 15 from a gas container (not shown) to the needle jet, or atomizer, 16 which is shown removably secured in a housing 17 screwed into a socket 18 formed in the wall of the aerating receptacle 3. The end of the needle jet, or atomizer, 16 projecting into the air-lock space 14, discharges the gas under pressure downwardly through the air-lock space 14 into the water in the said receptacle and thus water is prevented from entering the gas container by way of the pipe 15 and the said jet, or atomizer.

The combined discharge and safety valve 13 controlling the outlet port of the aerating receptable 3 is connected to an operating hand-lever 19 by means such that upward movement of the said lever causes the said valve to open the said port and downward movement of the lever will cause the valve to close the port with a resilient pressure which will yield to permit the said valve to open the said port should the aerated water in the said receptacle exceed a predetermined pressure, and then cause the said valve to be reseated when the excess pressure has escaped.

This is effected by connecting the combined discharged and safety valve 13 by a shackle 27 to a pin 20 passed transversely through a tubular piece 21, having secured thereto a guiding element 22 slidable in the discharge vessel 4, and through the ends of a pair of eccentric straps 23 mounted on an eccentric 24 rotatably mounted on a shaft 25 fixed in a slotted extension 26 of the discharge vessel 4, to which eccentric the hand-lever 19 is secured. The shackle 27 has outwardly bent ends which fit into holes in a collar formed on the valve 13, and the looped end of the said shackle is normally held in engagement with the pin 20 by a spring 28 interposed between the said valve and the guiding element 22. When the valve 13 reaches its seating further downward movement of the hand-lever 19 causes the pin 20, the tubular piece 21 and the guiding element 22 thereon to move relatively to the shackle 27 and compresses the spring 28 so that it acts to exert a predetermined pressure on the said valve to maintain it normally on its seating. This spring will however yield and permit the valve to open should the pressure in the aerating receptacle 3 exceed that exerted by the spring so that the excess pressure can escape as aforesaid, after which the said spring re-seats the said valve.

After the water in the receptacle 3 has been aerated it is necessary that its inlet port should not be opened before its outlet port, otherwise the aerated water, due to its greater pressure, would pass through the said inlet port into the inverted bottle 2. The combined discharge and safety valve 13 is therefore connected to the valve 7 by means which will cause, upon the operation of the hand-lever 19, the valve 7 to open the inlet port at a predetermined time after the valve 13 has opened the outlet port. This is effected by connecting the stem 29 of the valve 13 to the valve 7 by a coupling which will permit of a small movement of the said stem relatively to the valve 7 at the commencement of the upward movement of the said stem. This coupling may consist, as shown in the drawing, of a non-rotatable disc 30 slidable in a socket 31 formed in the upper portion of the valve 7, into which disc the end of the stem 29 is screwed. Initial movement of the valve 13 opens the outlet port controlled thereby and causes the disc 30 to ascend in the socket 31, whereupon subsequent movement causes the said disc to engage and lift a collar 32 secured within the said socket 31 at a suitable distance above the said disc thereby actuating the valve 7 in opposition to the action of the spring 9 and opening the inlet port.

When in operation for service, the operating hand-lever 19 is turned in the direction to lift the valves 7 and 13 off their seatings so that the inlet and outlet ports of the aerating receptacle 3 are opened as shown in the drawing. Water then flows into the aerating receptacle 3 and when the latter is full, which can be observed by the overflow of water through the outlet spout 33 from the discharge vessel 4, the said operating hand-lever is turned in the reverse direction so that the inlet and outlet ports are both closed. When aerated water is required, the operator admits sufficient gas, under pressure, to the aerating receptacle 3 to effect aeration of the water therein. Should the pressure in the aerating receptacle 3 exceed a predetermined amount the spring 28 of the combined discharge and safety valve 13 controlling the outlet port of the said receptacle will yield sufficiently to allow the excess pressure to escape past the said valve. After the supply of gas under pressure has been cut off, the operating hand-lever 19 is turned in the direction to open the inlet and outlet valves, the movement thereof being effected in their proper sequence as hereinbefore described, whereupon the inflow of water from the inverted bottle 2 expels the aerated water from the aerating receptacle into the discharge vessel and from thence through the outlet spout 33 thereof into a glass, or other receiver, placed in position to receive it. When the desired quantity of aerated water has been delivered from the aerating receptacle 3, the operating hand-lever 19 is turned in the direction to move the valves 7 and 13 so that the inlet and outlet ports are again closed, the said receptacle then containing a further charge of water ready for aerating.

In the drawing a counting device 34 for recording the number of operations of the apparatus is shown secured to the hand-lever 19 which is operated, upon the upward movement of the said lever, by a link 35 one end of which is connected to the actuating lever of the said device and the other end being secured to the fixed shaft 25 upon which the eccentric 24 turns. The drawing further shows the pipe 5 provided with an extension 5a, constituting a drain, normally closed by a cap 5b screwed onto the outer end thereof.

What I claim is:

1. The improved method of effecting the discharge of aerated liquid in apparatus of the kind referred to, which consists in expelling the aerated liquid from the aerating receptacle when the gas pressure is released by the inflow of a succeeding supply of non-aerated liquid in direct contact with the said aerated liquid.

2. Apparatus for aerating liquids, comprising an aerating receptacle and a discharge vessel, a source of supply in communication with the said aerating receptacle from which the liquid is obtained, valve controlled inlet and outlet ports communicating respectively between the said source of supply and the aerating receptacle and between the said aerating receptacle and the discharge vessel, the said valves being coupled and connected with an operating hand-lever by means such that during actuating of the said lever the outlet port is opened in advance of the inlet port.

3. Apparatus in accordance with the preceding claim 2, wherein the outlet port of the aerating receptacle is controlled by a combined discharge and safety valve having a seating and a spring and resiliently held onto its seating by the action of said spring so that should the pressure in the aerating receptacle exceed that exerted by the said spring the latter will yield and allow the said valve to open and release the pressure in the said receptacle until equilibrium is restored whereupon the said valve will then close again.

4. Apparatus in accordance with the preceding claim 2, wherein the coupling of the valves is effected by an element having a socket and being capable of limited movement axially within said socket, said outlet valve having a stem secured to the said element and the said socket comprising the upper portion of the inlet valve.

5. Apparatus in accordance with the preceding claim 2, wherein a partition is provided between said receptacle and vessel, and communication between the aerating receptacle and the discharge vessel is effected by a tubular piece in said partition, the said tubular piece projecting downwardly into the said aerating receptacle so that when the incoming liquid reaches its lower end an air-locked space is formed in the upper portion of the said receptacle, and wherein said source of supply comprises a gas supply container, a pipe in communication therewith, and a needle jet or atomizer in communication with said pipe, and wherein the end of said needle jet, or atomizer, projects into said space and discharges gas under pressure downwardly therethrough into the liquid in the said receptacle and thus prevents liquid passing therefrom into the gas supply container by way of said pipe.

WILLIAM HUCKS.